United States Patent
Mizue et al.

(10) Patent No.: US 9,048,575 B2
(45) Date of Patent: Jun. 2, 2015

(54) TEMPERATURE CONTROLLER, CABLE DEVICE, AND TEMPERATURE CONTROL UNIT

(75) Inventors: Takahito Mizue, Shanghai (CN); Nan Zhang, Shanghai (CN)

(73) Assignee: OMRON Corporation, Kyoto-shi (JP)

( * ) Notice: Subject to any disclaimer, the term of this patent is extended or adjusted under 35 U.S.C. 154(b) by 116 days.

(21) Appl. No.: 13/380,754

(22) PCT Filed: Mar. 16, 2011

(86) PCT No.: PCT/JP2011/056147
§ 371 (c)(1),
(2), (4) Date: Mar. 2, 2012

(87) PCT Pub. No.: WO2012/073527
PCT Pub. Date: Jun. 7, 2012

(65) Prior Publication Data
US 2012/0267443 A1    Oct. 25, 2012

(30) Foreign Application Priority Data

Nov. 29, 2010    (JP) .................................. 2010-265060

(51) Int. Cl.
| | |
|---|---|
| H01R 24/00 | (2011.01) |
| H01R 13/627 | (2006.01) |
| G05D 23/22 | (2006.01) |
| H01R 12/71 | (2011.01) |
| H01R 13/74 | (2006.01) |
| H01R 13/447 | (2006.01) |

(52) U.S. Cl.
CPC ........ *H01R 13/6273* (2013.01); *G05D 23/2208* (2013.01); *H01R 12/714* (2013.01); *H01R 13/447* (2013.01); *H01R 13/743* (2013.01)

(58) Field of Classification Search
USPC .................................. 439/660, 354, 357, 926
IPC ........ H01R 13/6275,13/6272, 13/6273, 13/506,
H01R 13/74, 23/7073, 23/725; H01B 17/305;
H02K 5/225
See application file for complete search history.

(56) References Cited

U.S. PATENT DOCUMENTS

| | | | | |
|---|---|---|---|---|
| 4,869,676 A | * | 9/1989 | Demler et al. .................. | 439/79 |
| 5,051,100 A | * | 9/1991 | Kato et al. ..................... | 439/140 |
| 5,232,373 A | * | 8/1993 | Sawada ......................... | 439/140 |
| 5,277,603 A | * | 1/1994 | Yamatani et al. ............. | 439/140 |
| 5,389,006 A | * | 2/1995 | Noschese ...................... | 439/354 |
| 5,830,001 A | * | 11/1998 | Kinoshita et al. ............. | 439/354 |

(Continued)

FOREIGN PATENT DOCUMENTS

| | | |
|---|---|---|
| CN | 1661642 A | 8/2005 |
| EP | 1 965 468 A1 | 2/2008 |
| JP | S64-48881 U | 3/1989 |
| JP | 02-021305 A | 1/1990 |

(Continued)

OTHER PUBLICATIONS

Chinese office action dated Apr. 2, 2014, for counterpart Chinese patent application, and English language translation of the Chinese office action.

*Primary Examiner* — Hien Vu
(74) *Attorney, Agent, or Firm* — Marvin A. Motsenbocker; MOTS Law, PLLC

(57) ABSTRACT

A temperature controller for adjusting temperature includes a substrate side contact portion formed on a surface on one side of a circuit substrate for processing an input signal. The substrate side contact portion is configured to be brought into contact with a cable device.

10 Claims, 8 Drawing Sheets

(56) References Cited

U.S. PATENT DOCUMENTS

| | | | |
|---|---|---|---|
| 6,123,553 A * | 9/2000 | Kobayashi et al. | 439/77 |
| 6,159,038 A * | 12/2000 | Wu | 439/495 |
| 7,160,136 B2 * | 1/2007 | Zhang et al. | 439/357 |
| 7,909,661 B2 * | 3/2011 | Wu | 439/701 |
| 2005/0192681 A1 | 9/2005 | Matsunaga et al. | |

FOREIGN PATENT DOCUMENTS

| | | |
|---|---|---|
| JP | 05-062742 A | 3/1993 |
| JP | 09-097656 A | 4/1997 |
| JP | 2001-014955 A | 1/2001 |
| JP | 2007-310647 A | 11/2007 |
| WO | 89/07849 A1 | 8/1989 |

* cited by examiner

TEMPERATURE CONTROLLER, CABLE DEVICE, AND TEMPERATURE CONTROL UNIT

TECHNICAL FIELD

The present disclosure relates to a temperature controller, a cable device, and a temperature control unit, and particularly relates to a temperature controller capable of communicating with a computer, a cable device, and a temperature control unit including such temperature controller and the cable device.

BACKGROUND ART

A technology of connecting a device and a computer (personal computer) by a USB (Universal Serial Bus) cable device or the like is for example disclosed in Patent Document 1.

FIG. 12 is a view showing a conventional temperature controller 100. Referring to FIG. 12, the conventional temperature controller 100 can be connected to a personal computer as well as the device disclosed in Patent Document 1.

PRIOR ART DOCUMENT

Patent Document

Patent Document 1: Japanese Unexamined Patent Publication No.

SUMMARY OF THE INVENTION

Problems to be Solved by the Invention

Referring to FIG. 12, in the conventional temperature controller 100, a substantially L-shaped opening 102 is provided on a lower surface 100a of a case 101 formed in a substantially rectangular parallelepiped. An acceptance port 103 for accepting a connector of a USB cable device used at the time of connecting the personal computer is provided in the opening 102. The acceptance port 103 is formed into a particular shape along the connector of the USB cable device.

In order to suppress an increase in management cost of the temperature controller and troublesomeness of a management task, the acceptance port as disclosed in FIG. 12 is generally provided in all temperature controllers irrespective of the existence of an acceptance port for each user.

However, for example, for some users utilizing the temperature controller, there is sometimes no need for connecting the temperature controller and the personal computer. For such users, the acceptance port is not required but is still provided in all the temperature controllers and takes extra cost. That is, an inexpensive temperature controller cannot be provided to the users not requiring the acceptance port.

An object of an aspect of this invention is to provide an inexpensive temperature controller.

An object of another aspect of this invention is to provide a cable device capable of being connected to the inexpensive temperature controller.

An object of still another aspect of this invention is to provide a temperature control unit provided with the inexpensive temperature controller.

Means for Solving the Problem

An aspect of the invention is a temperature controller to adjust a temperature, and a cable device is attachable to and detachable from the temperature controller. The temperature controller includes a substrate side contact portion formed on a surface on one side of a circuit substrate for processing an input signal and is configured to be brought into contact with the cable device without having a particular-shape acceptance port for accepting a connection portion that is connected to the cable device.

Such a temperature controller can be connected to the cable device by the substrate side contact portion formed on the surface on the one side of the circuit substrate. In this case, in the temperature controller, there is no need for having the particular-shape acceptance port for accepting the connection portion to be connected to the cable device. As a result, the inexpensive temperature controller can be provided.

The substrate side contact portion may include a gilded lead terminal on the surface on the one side of the circuit substrate.

Another aspect of this invention relates to a cable device. The cable device is attachable to and detachable from a temperature controller for adjusting a temperature, the temperature controller including a substrate side contact portion formed on a surface on one side of a circuit substrate for processing an input signal without having a particular-shape acceptance port for accepting a connection portion to be connected to the cable device. The cable device includes a connector side contact portion configured to be brought into contact with the substrate side contact portion.

Such a cable device can be connected to the temperature controller by the substrate side contact portion formed on the surface on the one side of the circuit substrate of the temperature controller. In this case, in the temperature controller, there is no need for having the particular-shape acceptance port for accepting the connection portion to be connected to the cable device. As a result, the cable device capable of being connected to the inexpensive temperature controller can be provided.

The cable device may further include a protection portion facing the connector side contact portion, the protection portion protecting the connector side contact portion from an exterior, and comprises a hook for preventing slip out of the cable device from the temperature controller. By this protection portion, the connector side contact portion can be protected from powder dust and the like in the exterior, and by this hook, the cable device can be firmly connected to the temperature controller.

A rib protruding outward may be provided in the connector side contact portion. Thereby, at the time of connecting to the temperature controller, backlash of the cable device can be suppressed.

The cable device may be formed as a substantially rectangular parallelepiped, and further includes a cable extending from a surface positioned in a first direction perpendicular to a second direction in which the cable device is attached to and detached from the temperature controller. Thereby, since the cable is not formed in a shape extending in the direction in which the cable is attached to and detached from the temperature controller, a space required at the time of installing the temperature controller can be reduced.

Still another aspect of this invention relates to a temperature control unit. The temperature control unit includes the temperature controller described above, and the cable device described above.

In such a temperature control unit, the cable device can be connected by the substrate side contact portion formed on the surface on the one side of the circuit substrate in the temperature controller. In this case, there is no need for having the particular-shape acceptance port for accepting the connection portion to be connected to the cable device. As a result, the temperature control unit provided with the inexpensive temperature controller can be provided.

Effect of the Invention

The temperature controller can be connected to the cable device by the substrate side contact portion formed on the surface on the one side of the circuit substrate. In this case, in the temperature controller, there is no need for having the particular-shape acceptance port for accepting the connection portion to be connected to the cable device. As a result, the inexpensive temperature controller can be provided.

The cable device can be connected to the temperature controller by the substrate side contact portion formed on the surface on the one side of the circuit substrate of the temperature controller. In this case, in the temperature controller, there is no need for having the particular-shape acceptance port for accepting the connection portion to be connected to the cable device. As a result, the cable device capable of being connected to the inexpensive temperature controller can be provided.

In the temperature control unit, the cable device can be connected by the substrate side contact portion formed on the surface on the one side of the circuit substrate in the temperature controller. In this case, there is no need for having the particular-shape acceptance port for accepting the connection portion to be connected to the cable device. As a result, the temperature control unit provided with the inexpensive temperature controller can be provided.

BRIEF DESCRIPTION OF THE DRAWINGS

FIG. 7 is cut by an arrow IX-IX.

FIG. 8 is cut by an arrow X-X.

EMBODIMENT FOR CARRYING OUT THE INVENTION

Figure 1:
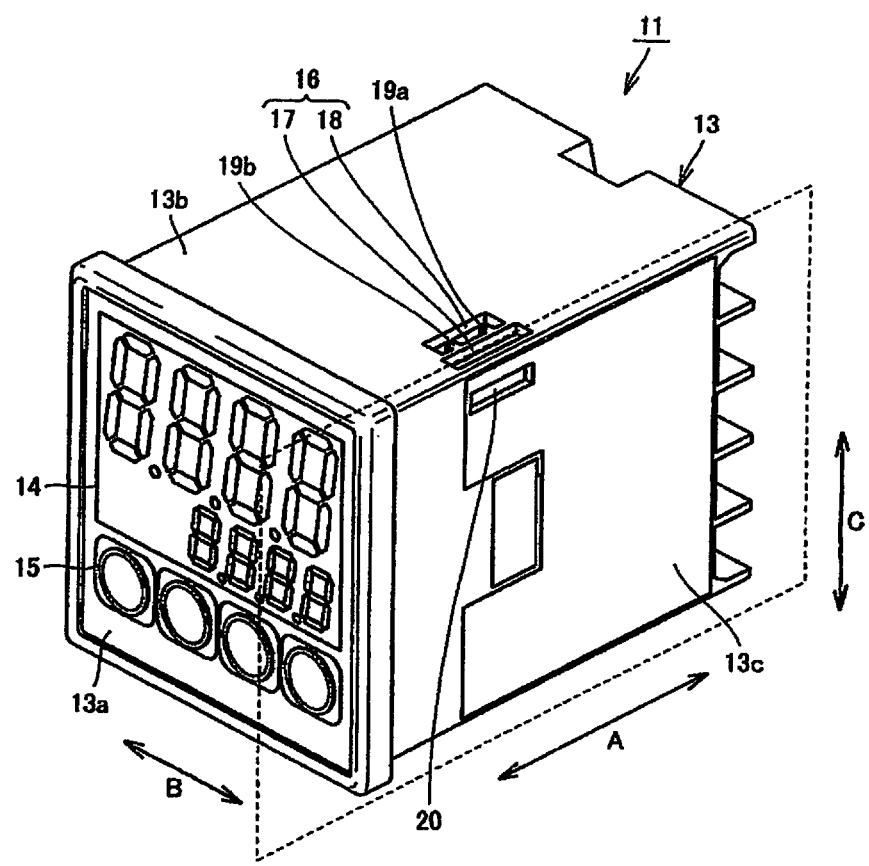
FIG. 1 is a perspective view showing a temperature controller according to one embodiment of this invention.
Figure 2:
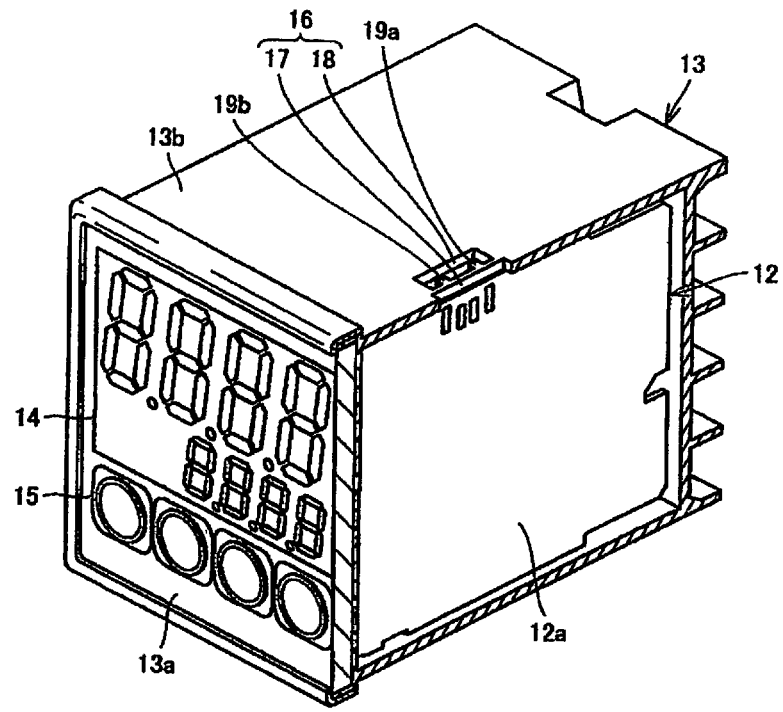
FIG. 2 is a sectional perspective view of a case where the temperature controller shown in FIG. 1 is cut by a surface shown by a dotted line in FIG. 1.

Hereinafter, a temperature controller according to one embodiment of this invention will be described with reference to the drawings. FIG. 1 is a perspective view showing a temperature controller 11 according to one embodiment of this invention. FIG. 2 is a sectional perspective view of a case where the temperature controller 11 shown in FIG. 1 is cut by a surface shown by a dotted line in FIG. 1, that is, by a surface passing through a first insertion hole 17 in parallel to a circuit substrate 12. It should be noted that FIG. 1 shows a case where the temperature controller 11 is disposed on a table, for example. The direction in which a display portion 14 is arranged and the opposite direction thereof serve as the front and rear direction. The horizontal direction which is the direction orthogonal to the front and rear direction serves as the left and right direction, and the vertically-downward direction and the opposite direction thereof serve as the up and down direction. It should be noted that an arrow A in FIG. 1 indicates the front and rear direction, an arrow B indicates the left and right direction, and an arrow C indicates the up and down direction.

Referring to FIGS. 1 and 2, the temperature controller 11 is provided with the circuit substrate 12, and a case 13 accommodating the circuit substrate 12. The temperature controller 11 is connected for example to a thermocouple (not shown) and an operation panel for operating the heating of a heater, and adjusts a temperature in such a manner that an object becomes a target temperature by controlling the turning ON/OFF of a power source of the heater based on a measured temperature inputted from the thermocouple.

The case 13 is formed as a substantially rectangular parallelepiped which is a shape elongated in the front and rear direction. The display portion 14 for displaying the inputted measured temperature and the like, and an operation portion 15 for receiving an input of the target temperature and the like from a user are included in a front side surface 13a.

In the case 13, an insertion hole 16 into which a connector of a cable device is inserted is provided, the insertion hole serving as an interface with the cable device for the temperature controller 11 to communicate with a personal computer (not shown) and the like. The insertion hole 16 includes a first insertion hole 17 and a second insertion hole 18. The first and second insertion holes 17 and 18 are provided in a front right end of an upper side surface 13b of the case 13. When seen from the upper side, the first and second insertion holes 17 and 18 are formed in a rectangular shape along the front and rear direction. The first and second insertion holes 17 and 18 are provided in parallel. By providing the insertion hole 16 in such a way, the connector can be easily inserted when the temperature controller 11 is disposed on the table, and the temperature controller 11 can be stabilized on the table even when the connector is inserted.

A part of the connector brought into contact with the circuit substrate 12 is inserted into the first insertion hole 17, and a part of the connector to be fixed to the case 13 is inserted into the second insertion hole 18. It should be noted that a detailed configuration of the connector will be described later.

Convex portions 19a and 19b are provided in the second insertion hole 18. The convex portions 19a and 19b protrude from a wall surface on the side of the first insertion hole 17 among wall surfaces forming the second insertion hole 18. The convex portions 19a and 19b play for example a role of positioning at the time of inserting the connector into the insertion hole 16.

An inspection hole 20 for inspecting an action of the temperature controller 11 is provided in the case 13. The inspection hole 20 is provided at a position close to the insertion hole 16. Specifically, the inspection hole is provided in an upper front end of a right side surface 13c of the case 13. It should be noted that the inspection hole 20 is used for revising a current temperature, for example.

Although not shown, ventilation holes are provided at a plurality of points in the case 13.

Figure 3:
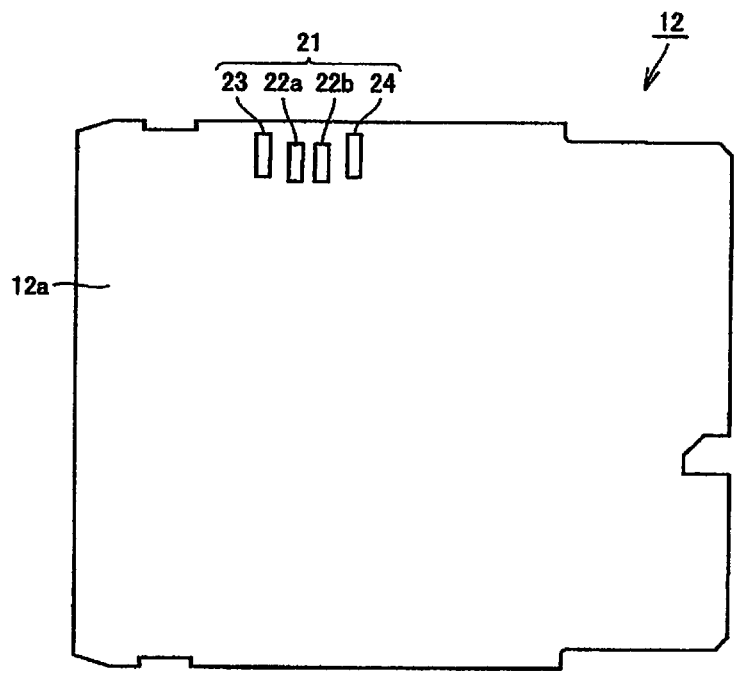
FIG. 3 is a plan view showing a circuit substrate.

The circuit substrate 12 processes for example an input signal from the operation portion 15 and the like. The circuit substrate 12 is formed in a thin plate shape, and arranged inside the case 13 along the front and rear direction. FIG. 3 is a plan view showing the circuit substrate 12. Referring to FIG. 3, the circuit substrate 12 includes a substrate side contact portion 21 brought into contact with the connector at the time of inserting the connector of the cable device into the insertion hole 16. The substrate side contact portion 21 is a gilded lead terminal. The substrate side contact portion 21 includes two signal wires 22a, 22b, a power wire 23, and a ground (GND) wire 24. It should be noted that for easy understanding, the figure only shows the lead terminal of the substrate side contact portion 21.

The circuit substrate 12 is installed in such a manner that the substrate side contact portion 21 is placed at a position close to the first insertion hole 17, and installed in such a manner that a surface 12a in which the substrate side contact portion 21 is positioned is positioned on the side of the first insertion hole 17. The substrate side contact portion 21 is installed so as to face the inspection hole 20. That is, the substrate side contact portion 21 is used for both insertion of the connector and inspection.

Figure 4:
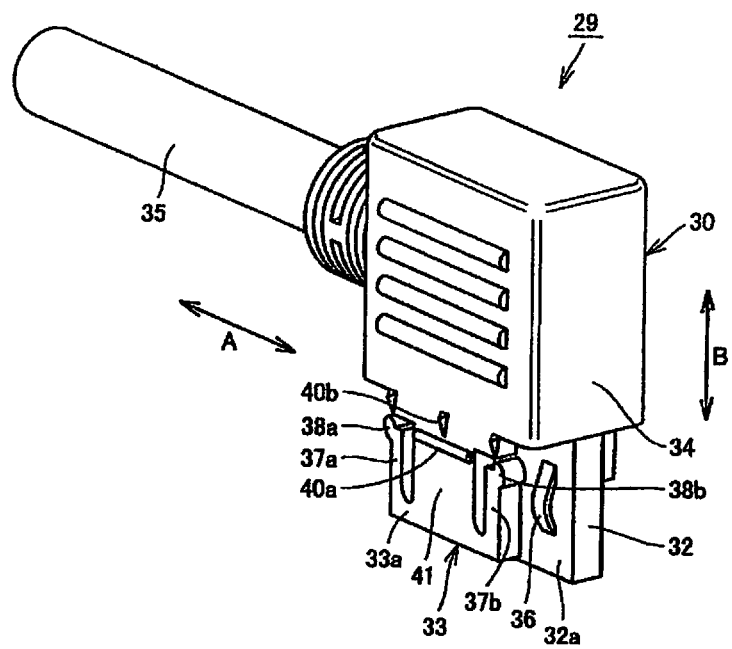
FIG. 4 is a perspective view showing a cable device.
Figure 5:
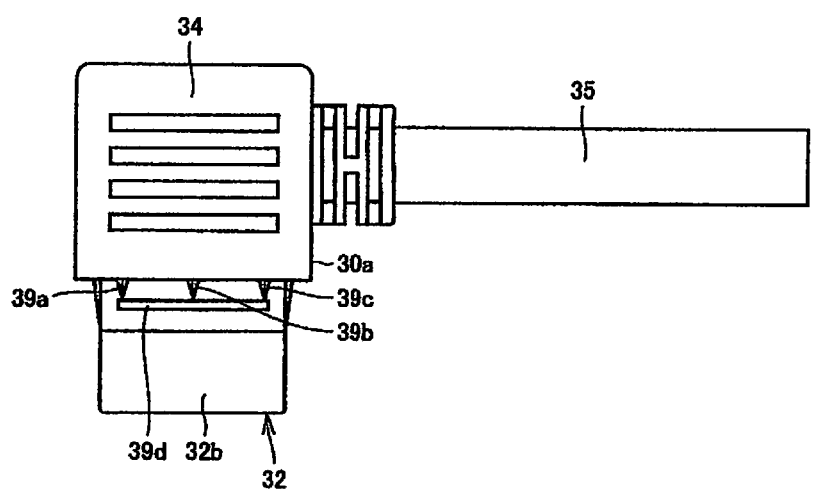
FIG. 5 is a view in which a connector is seen from the side of a holding portion.
Figure 6:
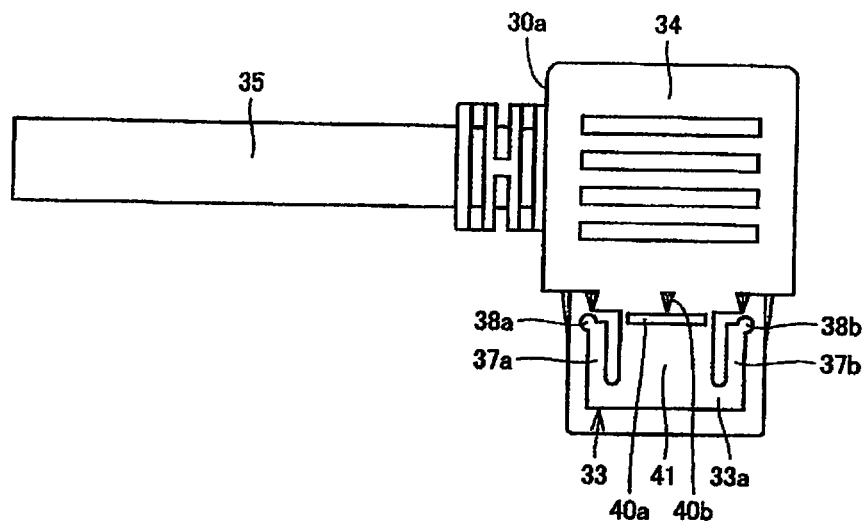
FIG. 6 is a view in which the connector is seen from the side of a protection portion.

FIG. 4 is a perspective view showing the cable device 29 described above. It should be noted that in the cable device 29, the direction in which a cable 35 is attached serves as the rear direction, and the opposite direction thereof serves as the front direction. The insertion direction of a connector 30 serves as the down direction, and the opposite direction thereof serves as the up direction. It should be noted that an arrow A in FIG. 4 indicates the front and rear direction, and an arrow B indicates the up and down direction. FIG. 5 is a view in which the connector 30 is seen from the side of a holding portion 32. FIG. 6 is a view in which the connector 30 is seen from the side of a protection portion 33.

Referring to FIGS. 4 to 6, the cable device 29 is attachable to and detachable from the temperature controller 11, and used when the temperature controller 11 communicates with the personal computer (not shown) and the like. The cable device 29 is provided with the connector 30 inserted into the insertion hole 16 of the temperature controller 11, and the cable 35 attached to the rear side of the connector 30. The cable device 29 is a communication cable device used when the temperature controller 11 communicates with the personal computer and the like, and a front end (not shown) extending from the cable 35 is connected to the personal computer. This communication is utilized for example in a case where the target temperature is inputted from the personal computer.

The cable 35 is provided in the direction perpendicular to the insertion direction of the connector 30. Specifically, the cable extends from a rear side surface 30a positioned in the direction perpendicular to the insertion direction of the connector 30.

The connector 30 is inserted into the insertion hole 16 of the case 13 as described above. The connector 30 is a USB connector formed as a substantially rectangular parallelepiped, provided with the holding portion 32, the protection portion 33, and a mold portion 34. The holding portion 32 holds a connector side contact portion 36 brought into contact with the substrate side contact portion 21 at the time of inserting into the insertion hole 16. The protection portion 33 is provided so as to face the holding portion 32, and protects the connector side contact portion 36. The mold portion 34 fixes the holding portion 32 and the like, and serves as for example a part to be gripped by the user at the time of inserting and removing the connector 30.

The holding portion 32 is inserted into the first insertion hole 17. The connector side contact portion 36 brought into contact with the substrate side contact portion 21 is provided in the holding portion 32. When the holding portion 32 is inserted into the first insertion hole 17, the connector side contact portion 36 is brought into contact with the substrate side contact portion 21. When the holding portion 32 is removed from the first insertion hole 17, the connector side contact portion 36 is brought away from the substrate side contact portion 21. When brought into contact with the substrate side contact portion 21, the connector side contact portion 36 becomes a path for supplying power and inputting and outputting signals to the temperature controller 11. The connector side contact portion 36 is a card-edge connector formed in a plate spring shape, provided in correspondence with the two signal wires 22a and 22b, the power wire 23, and the GND wire 24 of the substrate side contact portion 21. The connector side contact portion 36 is provided so as to be positioned on the inner side of the holding portion 32. Ribs 39a, 39b, 39c, and 39d protruding outward are provided in the holding portion 32. The ribs 39a, 39b, 39c, and 39d are provided on a surface 32b of the holding portion 32 on the opposite side of the connector side contact portion 36. When the holding portion 32 is inserted into the first insertion hole 17, the ribs 39a, 39b, 39c, and 39d are abutted with a wall surface of the first insertion hole 17 so as to prevent backlash in the first insertion hole 17.

The protection portion 33 is inserted into the second insertion hole 18. The protection portion 33 is provided so as to face the connector side contact portion 36, and protects the card-edge connector of the connector side contact portion 36 from powder dust and the like in an exterior. Ribs 40a and 40b protruding outward are provided in the protection portion 33 as well as the holding portion 32. The ribs 40a and 40b are provided on a surface 33a of the protection portion 33 on the opposite side of a surface facing the connector side contact portion 36. When the protection portion 33 is inserted into the second insertion hole 18, the ribs 40a and 40b are abutted with wall surfaces 18a of the second insertion hole 18 so as to prevent backlash in the second insertion hole 18. Hooks 37a and 37b to be locked onto the case 13 when the connector 30 is inserted into the insertion hole 16 so as to fix the connector 30 to the case 13 are provided in the protection portion 33.

The hooks 37a and 37b are provided on both the front and rear sides of a center portion 41 positioned in center in the front and rear direction of the protection portion 33, coupled to the center portion 41 in lower ends of the center portion 41, and extend upward from the coupled points while having predetermined gaps from the center portion 41. Claw portions 38a and 38b protruding in the direction in which the hooks are brought away from the center portion 41 are provided in upper front ends. The claw portions 38a and 38b are locked onto the case 13, so that the connector 30 can be prevented from slipping out from the case 13.

Figure 7:
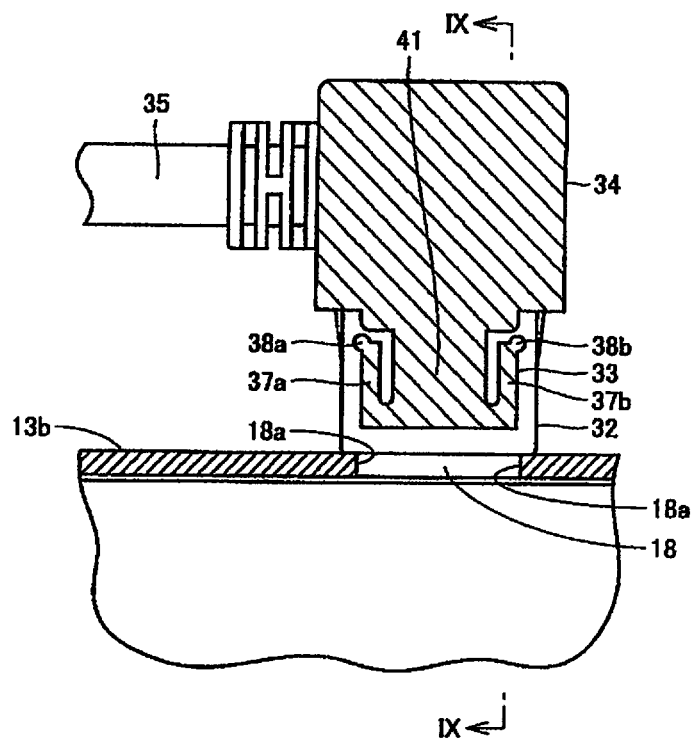
FIG. 7 is a view showing a state before the connector is inserted into an insertion hole.
Figure 8:
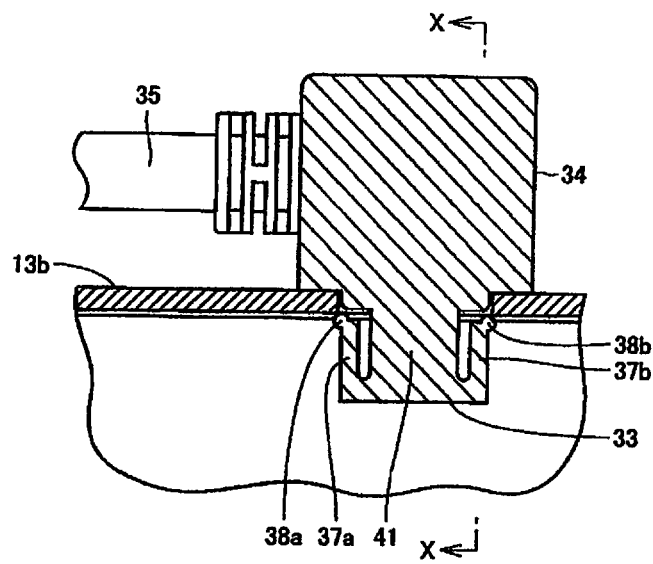
FIG. 8 is a view showing a state where the connector is inserted into the insertion hole.
Figure 9:
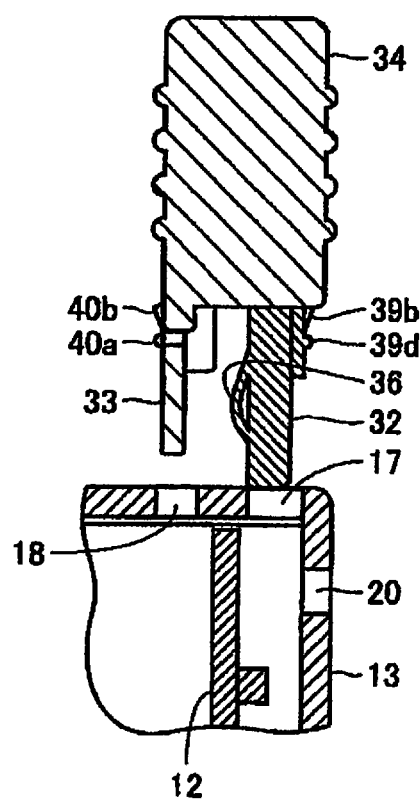
FIG. 9 is a sectional view of a case where
Figure 10:
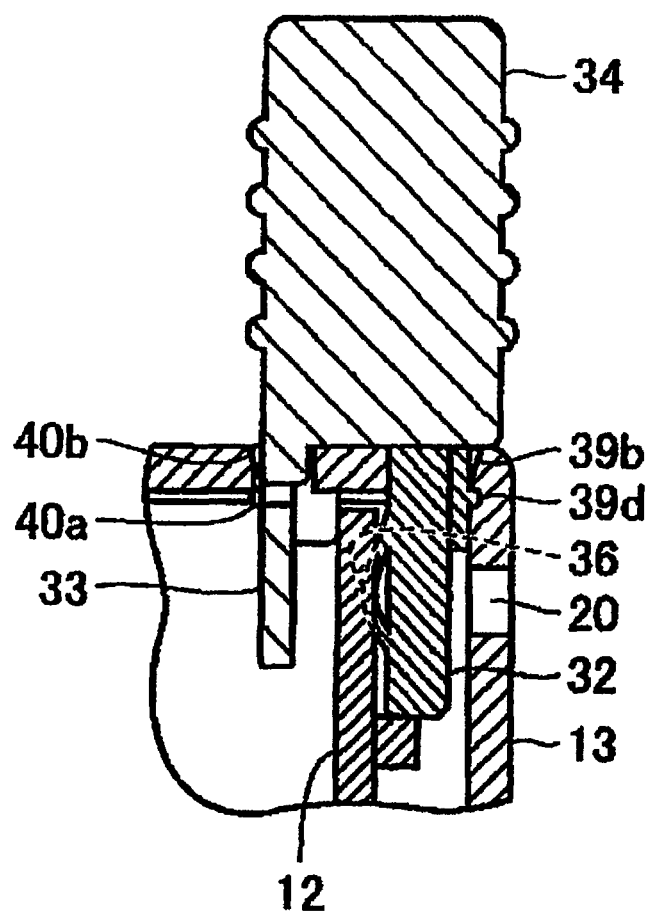
FIG. 10 is a sectional view of a case where

A case where the connector 30 is inserted into the insertion hole 16 so as to connect the cable device 29 to the temperature controller 11 will be described. FIG. 7 is a view showing a state before the connector 30 is inserted into the insertion hole 16, and serves as a sectional view of a case where the connector is cut in the front and rear direction so as to show the protection portion 33. FIG. 8 is a view showing a state where the connector 30 is inserted into the insertion hole 16, and serves as a sectional view of a case where the connector is cut in the front and rear direction so as to show the protection portion 33. FIG. 9 is a sectional view of a case where FIG. 7 is cut by an arrow IX-IX. FIG. 10 is a sectional view of a case where FIG. 8 is cut by an arrow X-X.

Firstly, referring to FIGS. 7 and 9, specifically, when the connector 30 comes to an opening of the insertion hole 16, the holding portion 32 is firstly inserted into the first insertion hole 17, and then the protection portion 33 is inserted into the second insertion hole 18. The connector side contact portion 36 of the holding portion 32 is brought into contact with the substrate side contact portion 21 of the circuit substrate 12. The hooks 37a and 37b are abutted with the front and rear wall surfaces 18a forming the second insertion hole 18, and moved to the side of the center portion 41 so as to fill the predetermined gaps described above. Thereby, the claw portions 38a and 38b are accommodated in the case 13. As shown in FIGS. 8 and 10, when completely inserted into the insertion hole 16, the hooks 37a, 37b already moved to the side of the center portion 41 are moved in the direction in which the hooks are brought away from the center portion 41.

Thereby, the claw portions 38a, 38b get held up with the upper side surface 13b of the case 13.

Figure 12:
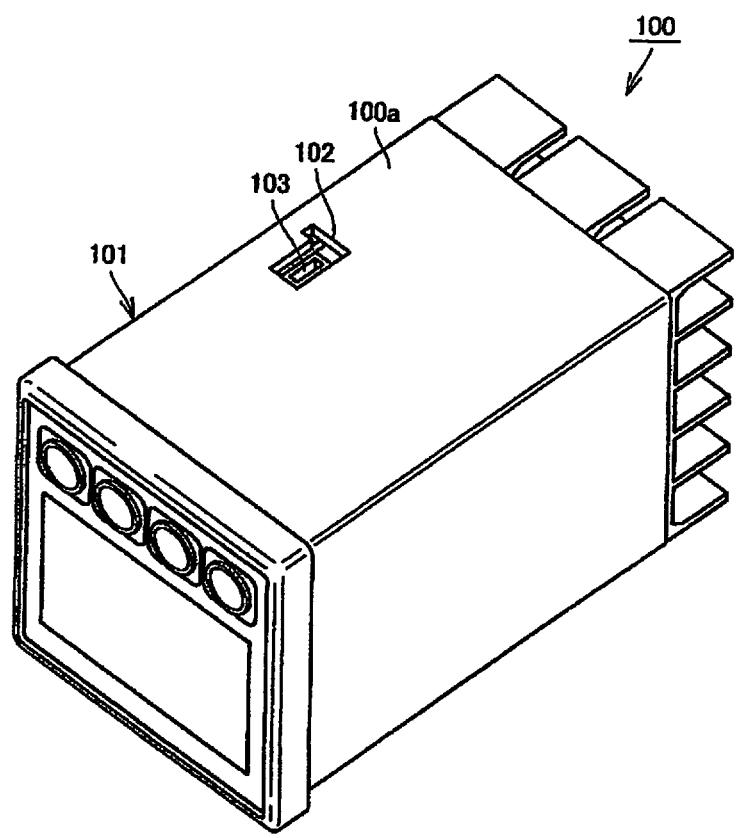
FIG. 12 is a view showing a conventional temperature controller.

In such a way, the cable device 29 is connected to the temperature controller 11. That is, the temperature controller 11 is connected to the cable device 29 by the substrate side contact portion 21 provided in the circuit substrate 12. Therefore, a particular-shape acceptance port for accepting a connection portion to be connected to a conventional cable device, that is, a connector of the conventional cable device is not provided in the temperature controller 11 of the present invention. That is, in a conventional temperature controller 100 disclosed in FIG. 12, an opening 102 is provided in a case 101, and an acceptance port 103 is provided in the opening 102. However, in the temperature controller 11 of the present invention, the insertion hole 16 is only provided in the case 13.

Figure 11:
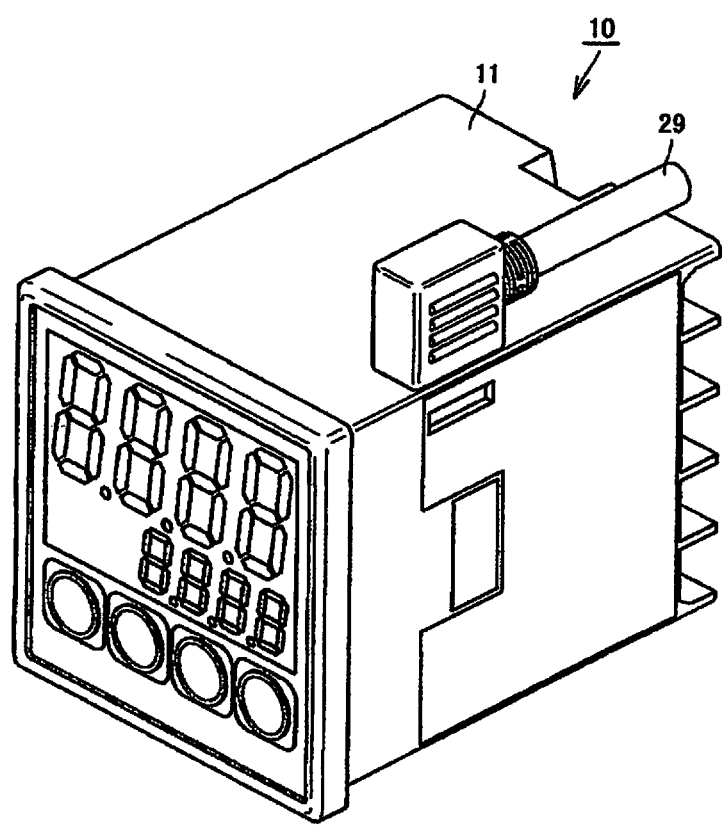
FIG. 11 is a view showing a state where the connector is inserted into the insertion hole of the temperature controller and the cable device is connected to the temperature controller.

FIG. 11 is a view showing a state where the connector 30 is inserted into the insertion hole 16 of the temperature controller 11 and the cable device 29 is connected to the temperature controller 11, and serves as a perspective view showing a temperature control unit 10. The temperature control unit 10 is provided with the temperature controller 11 and the cable device 29.

With such a configuration, the temperature controller 11 can be connected to the cable device 29 by the substrate side contact portion 21 formed on the surface 12a on one side of the circuit substrate 12. In this case, in the temperature controller 11, there is no need for having the particular-shape acceptance port for accepting the connection portion to be connected to the cable device 29. As a result, the inexpensive temperature controller 11 can be provided.

Such a cable device 29 can be connected to the temperature controller 11 by the substrate side contact portion 21 formed on the surface 12a on the one side of the circuit substrate 12 of the temperature controller 11. In this case, in the temperature controller 11, there is no need for having the particular-shape acceptance port for accepting the connection portion to be connected to the cable device 29. As a result, the cable device 29 capable of being connected to the inexpensive temperature controller 11 can be provided.

In such a temperature control unit 10, the cable device 29 can be connected by the substrate side contact portion 21 formed on the surface 12a on the one side of the circuit substrate 12 in the temperature controller 11. In this case, there is no need for having the particular-shape acceptance port for accepting the connection portion to be connected to the cable device 29. As a result, the temperature control unit 10 provided with the inexpensive temperature controller 11 can be provided.

By adopting a mechanism of the USB connector in the cable device 29, the cable device 29 has high resistance to insertion and removal.

It should be noted that the example that the temperature controller 11 is connected to the thermocouple and the operation panel for operating the heating of the heater so as to adjust the temperature is described in the above embodiment. However, the present invention is not limited to this but the temperature controller may be connected to a flow meter or a pressure meter so as to adjust a flow rate or pressure.

The example where the cable device 29 is connected to the personal computer is described. However, the present invention is not limited to this but for example an attachment may be attached to the cable device 29. In such a way, for example, even in a case where an interface on the side of the personal computer is changed, only a part from the attachment to the personal computer can be changed, and there is no need for changing a part on the side of the temperature controller 11.

Although the embodiment of this invention is described above with reference to the drawings, this invention is not limited to the embodiment shown in the figures. Various corrections and modifications can be added to the embodiment shown in the figures within the same range as or equal range to this invention.

INDUSTRIAL APPLICABILITY

This invention is effectively utilized for a device requiring communication.

DESCRIPTION OF SYMBOLS

10 Temperature control unit
11 Temperature controller
12 Circuit substrate
12a Surface
13 Case
13a Front side surface
13b Upper side surface
13c Right side surface
14 Display portion
15 Operation portion
16 Insertion hole
17 First insertion hole
18 Second insertion hole
18a Wall surface
19a, 19b Convex portion
20 Inspection hole
21 Substrate side contact portion
29 Cable device
30 Connector
30a Rear side surface
32 Holding portion
32a, 32b Surface
33 Protection portion
33a Surface
34 Mold portion
35 Cable
36 Connector side contact portion
37a, 37b Hook
38a, 38b Claw portion
39a, 39b, 39c, 39d Rib
40a, 40b Rib
41 Center portion

The invention claimed is:

1. A temperature controller for adjusting a temperature, the temperature controller, to and from which a cable connector is attachable and detachable, comprising:
   a circuit substrate for processing an input signal;
   a case accommodating the circuit substrate;
   a wall of the case being provided with a first insertion hole to insert a holding terminal portion of the cable connector, and a second insertion hole to insert a protection portion of the cable connector, the first and second insertion holes being provided adjacent to and separate from each other;
   a substrate side contact portion formed on a surface on only one side of the circuit substrate and configured to be brought into contact with the holding terminal portion of the cable connector,
   wherein the cable connector is snugly held in place inside the case by way of the holding terminal portion of the cable connector being fitted within the first insertion hole and the protection portion of the cable connector being fitted within the second insertion hole.

2. The temperature controller according to claim 1, wherein the substrate side contact portion includes a gilded lead terminal on the surface on the one side of the circuit substrate.

3. The temperature controller according to claim 1, wherein the substrate side contact portion includes a power terminal configured to transmit power and a signal terminal configured to transmit a signal and wherein the power terminal is closer to an edge of the circuit substrate than the signal terminal.

4. The cable device according to claim 1, wherein a rib extends downwards inside the case when the holding terminal portion is inserted into the first insertion hole, to thereby hold the cable connector in place when the holding terminal portion is inserted into the first insertion hole.

5. The temperature controller according to claim 1, wherein the first insertion hole has a length and a width such that, when the holding terminal portion is inserted into the first insertion hole, the cable connector is not snugly held in place within the first insertion hole without assistance of the protection portion of the cable connector being inserted into the second insertion hole.

6. A cable connector attachable to and detachable from a temperature controller for adjusting a temperature, the temperature controller including:
   a circuit substrate for processing an input signal;
   a case accommodating the circuit substrate;
   a wall of the case being provided with an insertion hole to insert a holding terminal portion of the cable connector;
   a substrate side contact portion formed on a surface on only one side of the circuit substrate, the cable connector comprising:
   a connector side contact portion configured to be brought into contact with the substrate side contact portion,
   wherein the connector side contact portion comprises a protection portion having a rib protruding outward in a same direction as the connector side contact portion to thereby be housed within an interior of the case,
   wherein the protection portion facing the connector side contact portion, and
   wherein the protection portion is configured to protect the connector side contact portion from an exterior.

7. The cable connector according to claim 6 formed as a substantially rectangular parallelepiped, further comprising:
   a cable extending from a surface positioned in a first direction perpendicular to a second direction in which the cable connector is attachable to and detachable from the temperature controller.

8. The cable device according to claim 6, further comprising:
   a hook for preventing slip out of the cable connector from the temperature controller.

9. A temperature controller for adjusting a temperature, the temperature controller, to and from which a cable connector is attachable and detachable, comprising:
   a circuit substrate for processing an input signal;
   a case accommodating the circuit substrate;
   a wall of the case being provided with a first insertion hole to insert a holding terminal portion of the cable connector, and a second insertion hole to insert a protection portion of the cable connector, the first and second insertion holes being provided adjacent to and separate from each other; and
   a substrate side contact portion formed on a surface on only one side of the circuit substrate for processing an input signal and configured to be brought into contact with the cable connector,
   wherein the substrate side contact portion is configured for accepting a connection portion connected to the cable connector, and
   wherein the cable connector is snugly held in place inside the case by way of the holding terminal portion of the cable connector being fitted within the first insertion hole and the protection portion of the cable connector being fitted within the second insertion hole.

10. The temperature controller according to claim 9, wherein the substrate side contact portion includes a gilded lead terminal on the surface on the one side of the circuit substrate.

* * * * *